United States Patent
Yaron et al.

(10) Patent No.: US 9,392,303 B2
(45) Date of Patent: Jul. 12, 2016

(54) DYNAMIC ENCODING OF MULTIPLE VIDEO IMAGE STREAMS TO A SINGLE VIDEO STREAM BASED ON USER INPUT

(76) Inventors: Ronnie Yaron, Raanana (IL); Tuvia Barak, Palisades, NY (US)

(*) Notice: Subject to any disclaimer, the term of this patent is extended or adjusted under 35 U.S.C. 154(b) by 498 days.

(21) Appl. No.: 13/281,522

(22) Filed: Oct. 26, 2011

(65) Prior Publication Data
US 2013/0111051 A1   May 2, 2013

(51) Int. Cl.
| | |
|---|---|
| H04N 21/2343 | (2011.01) |
| H04N 21/431 | (2011.01) |
| H04N 21/472 | (2011.01) |
| H04L 29/06 | (2006.01) |

(52) U.S. Cl.
CPC .... *H04N 21/234363* (2013.01); *H04L 65/4084* (2013.01); *H04L 65/607* (2013.01); *H04N 21/4312* (2013.01); *H04N 21/47202* (2013.01)

(58) Field of Classification Search
None
See application file for complete search history.

(56) References Cited

U.S. PATENT DOCUMENTS

| | | | | |
|---|---|---|---|---|
| 8,606,942 B2* | 12/2013 | Perlman et al. | ............... | 709/229 |
| 2003/0023982 A1* | 1/2003 | Lee | ............... | H04N 21/234327 725/116 |
| 2007/0024706 A1* | 2/2007 | Brannon et al. | ............... | 348/142 |
| 2007/0025342 A1* | 2/2007 | Obata | ........................... | 370/352 |
| 2008/0232763 A1* | 9/2008 | Brady | ............................... | 386/46 |
| 2011/0126255 A1* | 5/2011 | Perlman et al. | ............... | 725/116 |
| 2011/0145879 A1* | 6/2011 | Rajamani et al. | ............. | 725/116 |
| 2012/0062563 A1* | 3/2012 | St. John et al. | ............... | 345/419 |
| 2012/0102184 A1* | 4/2012 | Candelore | ..................... | 709/224 |
| 2012/0209933 A1* | 8/2012 | Ridges et al. | ................. | 709/208 |

OTHER PUBLICATIONS

Diary of an x264 developer, http://x264dev.multimedia.cx/archives/249, Jan. 13, 2010.
Passing on the Left. Notes about low latency video, http://www.schleef.org/blog/2009/03/27/notes-about-low-latency-video/, Mar. 27, 2009.

* cited by examiner

*Primary Examiner* — Greg C Bengzon
(74) *Attorney, Agent, or Firm* — Clifford H. Kraft

(57) ABSTRACT

A system and method for combining multiple video bit streams on a server using low latency encoding and stream them to a user based on user input over the network. Each frame of the resulting single video stream can include anything from a single video window at full size to multiple video windows at a variety of sizes. This allows apparently instantaneous video switching by the user without the buffering start-up delay normally suffered by a user when a new video stream is selected. User browsing can be done by scrolling through smaller scale thumbnail videos and zooming of one or more of the videos. The user can also browse video based on geospatial context.

13 Claims, 4 Drawing Sheets

USER INPUT

| SIZE | STREAM | | |

DYNAMIC ENCODING OF MULTIPLE VIDEO IMAGE STREAMS TO A SINGLE VIDEO STREAM BASED ON USER INPUT

BACKGROUND

1. Field of the Invention

The present invention relates generally to video streaming and more particularly to dynamic encoding of multiple video streams onto a single video stream based on input from a user.

2. Description of the Prior Art

Video and audio streaming are well-known in the art. Earlier radio stations and other audio content was streamed to computers in real-time. More recently, with the increase in processor speed, the improvement of compression algorithms, and the advent of more efficient ways to stream through networks, video streaming has become widespread. A typical system has been called x264. Streaming in general means putting a real-time audio or video content into a network such as the Internet and receiving and playing that content at a remote station. The state of the art now allows even streaming of high definition (HD) video over the Internet.

Generally, streaming involves the ability to continuously put packets containing content into the network, and, with look-ahead buffering (called VBV buffers) at the receiving end, continuously streaming the content to a decoder. The buffering is necessary since typically at the receiver, the flow of packets may not come in continuously, but rather arrive in bursts with periods between bursts with no packets. The buffering allows the receiver to recreate the real-time stream. The only requirement is that the average packet arrival rate be at least equal the transmission rate.

Recently, the ability to perform video streaming on a dynamic application such as an action video game has become possible with the appearance of what is called low latency encoding. This allows the user to provide input such as keyboard clicks and mouse movement back to a video game running on a remote server, while simultaneously receiving video depicting the game screen from that server over the network with very little lag. Current systems can reduce the lag or latency to a point where it appears that the game is being played on the user's computer.

Latency or lag is the amount of delay the system introduces into the packet stream. Typical applications that send streams of video may have latencies approaching several seconds. An example of this is the voice and video telephone system known as SKYPE™. Another example is video conferencing which may have latencies of from 500 to 750 mS. While these latencies are acceptable for mostly one-way communication with a sparse number of turn-arounds, they are totally unacceptable for video games and the like where when a user clicks the mouse, they expect an almost instantaneous response from the game.

Low latency video streaming can work either by scan line encoding or frame (or frame slice) encoding. Frame encoding uses a single pass per frame and works by having at least three frame buffers in the encoder and also in the decoder. One buffer is filling with content, while simultaneously a second buffer is being coded, while simultaneously the third buffer is being transmitted (with the reverse process occurring at the receiver). This can lead to a overall latency of around 160 mS to 200 mS (plus the network delay). Scan line encoding can reduce this latency to several milliseconds. In a scan-line system, coding is done only on a few scan lines at a time (typically three). It has been reported that it is possible to approach a latency of about 1 mS for a 1080 pixel frame at 30 frames per second. Of course the encoding of only three scan lines at a time does not result in as good an image as full frame or multiple frame encoding.

A very recent type of very low latency encoding uses frame slice (or multi-slice) encoding. In this technique, every frame is capped to a fixed maximum size. Keyframes, which typically occur between groups of frames, have been eliminated by the use of a column of so-called intra blocks that move across the video from side-to-side refreshing the video. The classical keyframe has been totally replaced by spreading it over many frames in the form of intra blocks. Motion vectors are restricted so that blocks on one side of the refresh column do not reference blocks on the other side. Also, instead of encoding an entire frame, slices of frames are encoded (in a technique called slice-based threading). Every frame is split into slices, each slice is encoded on one core typically, and then the result is stitched back together to form the coded frame. Using these techniques, it is possible to stream an 800×600 pixel video stream running 30 frames per second with an end-to-end latency of under 10 mS (not including transport delay). (See http://x264dev.multimedia.cx/archives/249)

Thus, in such a system, the total latency in effect depends only on the end-to-end network delay. With various types of tunnels and routing algorithms, this can also be drastically reduced.

The low latency systems of the prior art have been directed almost exclusively to gaming with one forward path data flow and one reverse path data flow. It would be extremely advantageous to be able to take advantage of low latency encoding to multiplex multiple video content into a stream.

It would also be very advantageous to be able to take multiple video streams, encode them on a server into a single video stream, and then stream them to a user based on user input.

SUMMARY OF THE INVENTION

The present invention relates to combining multiple video bit streams on a server using low latency encoding and stream them to a user based on user input over the network. Each frame of the resulting single video stream can include anything from a single video window at full size to multiple video windows at a variety of sizes. This allows apparently instantaneous video switching by the user without the buffering start-up delay normally suffered by a user when a new video stream is selected. The present invention effectively does-away with buffering time altogether. The present invention also allows a user to quickly browse multiple video streams just as they might for still images. This can be done by scrolling through smaller scale thumbnail videos and zooming in to see a close-up of one or more of the videos.

The present invention also allows the user to browse video based on geospatial context. This is especially significant for videos recorded with location information such as videos from cellphones, GPS-equipped cameras, traffic and security cameras and the like. This is accomplished by the present invention by sending additional metadata about the particular video stream (or video thumbnail) such as its size and position within the single steam as well as other information that can include its global position, direction, source and the like.

According to the present invention, the user can send requests to the server to place certain content or groups of content on the video stream. For example, a user might request a screen of video thumbnails representing a system of security cameras. The user could tailor the screen by requesting only thumbnails of certain cameras, say cameras within a certain geographic area (such as all street cameras within four blocks of a certain location).

DESCRIPTION OF THE FIGURES

Attention is now directed to several drawings that illustrate features of the present invention.

Several drawings and illustrations have been presented to aid in understanding the present invention. The scope of the present invention is not limited to what is shown in the figures.

DETAILED DESCRIPTION OF THE PREFERRED EMBODIMENT

The present invention relates to combining multiple input video streams at a server into a single output video stream under control by a remote user. Each output video frame can include anywhere from a single video window at full size to multiple video windows at a variety of sizes. Metadata related to the input video streams making up the transmitted output stream can be sent on or along with the output video stream. This metadata can contain its size and position on the current screen as well as information about its global position, direction of view, source, and any other information relating to the input video stream.

A remote user in communication with the server over the network can control the format and content of the output video that is being streamed to him. This can be changed by the user at any time by simply sending a command to the server. In some embodiments of the invention, the user could be charged a fee based on the content or format being transmitted. Also, input from the user to the server does not necessarily have to come directly from the user, but rather can also be indirect. For example, a user panning a map, or flying through a 3-dimensional virtual environment, can automatically generate input to the server based on their virtual location and view direction rather than inputting the information manually. This information can then be continuously sent to the server to control the video streaming.

The present invention presents apparently instantaneous video switching by the user between content being transmitted from the server. Since all the content is at the server and ready to be transmitted a switch from one input stream to another or from one format to another does not require look-ahead buffering. Hence there is no buffering delay after the switch. The user experience is totally dynamic and responsive with no waiting time between videos and with the ability to view multiple videos at the same time and smoothly zoom in and out of the view.

Figure 1:
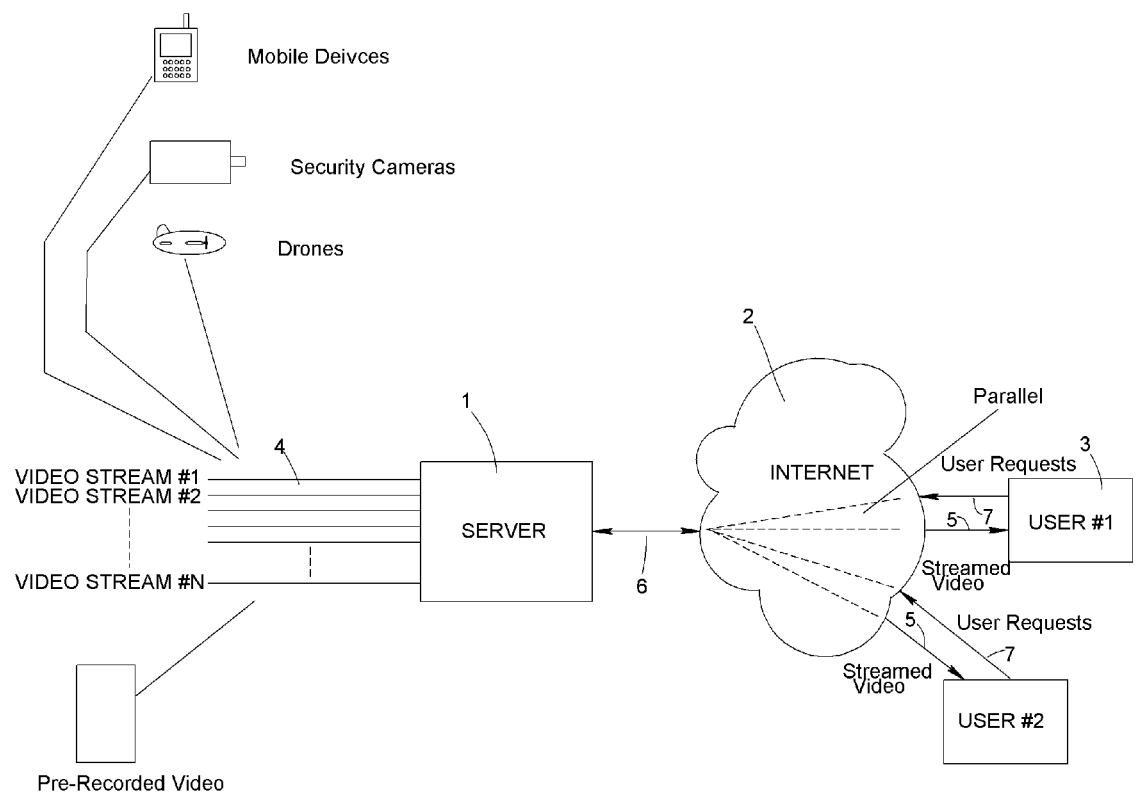
FIG. 1 shows a block diagram of an embodiment of the present invention.

FIG. 1 shows a block diagram of an embodiment of the present invention. A server 1 is connected to a network 2 such as the Internet through a wide bandwidth connection 6. The server 1 interfaces to N video input streams 4. Each of these input streams may have different transmission characteristics such as frame rate, encoding, embedded metadata and the like. The server 1 also receives input commands 7 from several different users 3. The server 1 typically decodes each of the incoming video streams (or those video input streams of interest) into a series of frames. Any metadata on a particular input stream can be stored. Each different user 3 can request a custom video output stream 5 to be sent to them. The input can include mobile device, security cameras, aerial drones, pre-recorded video and the like as shown in FIG. 1. The frames in a user's video output stream 5 are composed by the server 1 according to instructions given the server by the particular user 3 using low latency techniques. Thus, a user 3 can send a new command 7 to the server 1 changing the composition of the frames being sent with no switching delay. The composed frames can contain from one to M video streams chosen by the user. The number N of total video inputs 4 to the server 1 can be greater to or equal to M the maximum number of streams a particular user 3 can receive simultaneously. The composed frames can show anything from a single video window to a series of small thumbnail video windows. In particular, the different windows can be different sizes as shown in FIG. 2 with possibly one larger window and a collection of smaller windows. Metadata concerning the composed frames can optionally be sent along with the output frames.

Figures 2A, 2B:
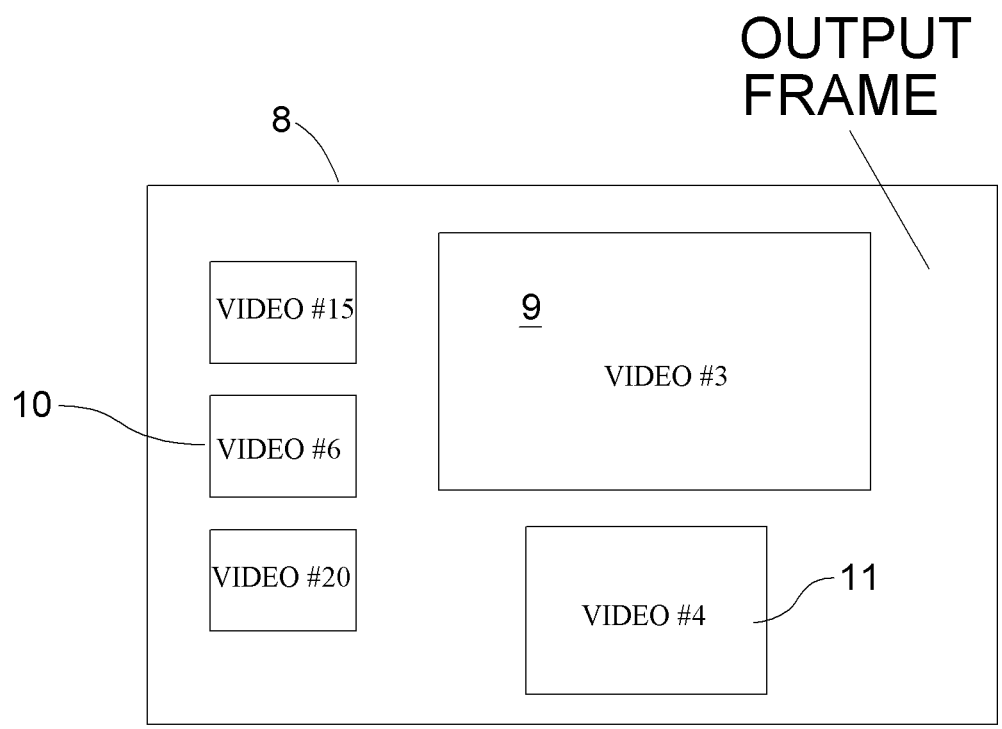
FIG. 2A shows an example of user instructions.
FIG. 2B shows a sample video screen that might appear to a user.

FIG. 2A shows an example of user input including a request for size and a request for a particular stream. User input can include other fields and other steams and sizes. FIG. 2B shows what a particular user screen 8 might look like. This particular user has commanded that a large main window 9 occupy the center of the screen and show the video content of most interest. A second, smaller window 11 has been positioned below the main window 9. A set of thumbnail videos 10 have been positioned on the left side of the screen 8. FIG. 2B is simply an example of a possible screen format. Any screen format or content is within the scope of the present invention. The user may at any time send a command to the server changing the format or the content of any of the windows. As previously stated, switching between content on the server does not incur any buffering delay.

Figure 3:
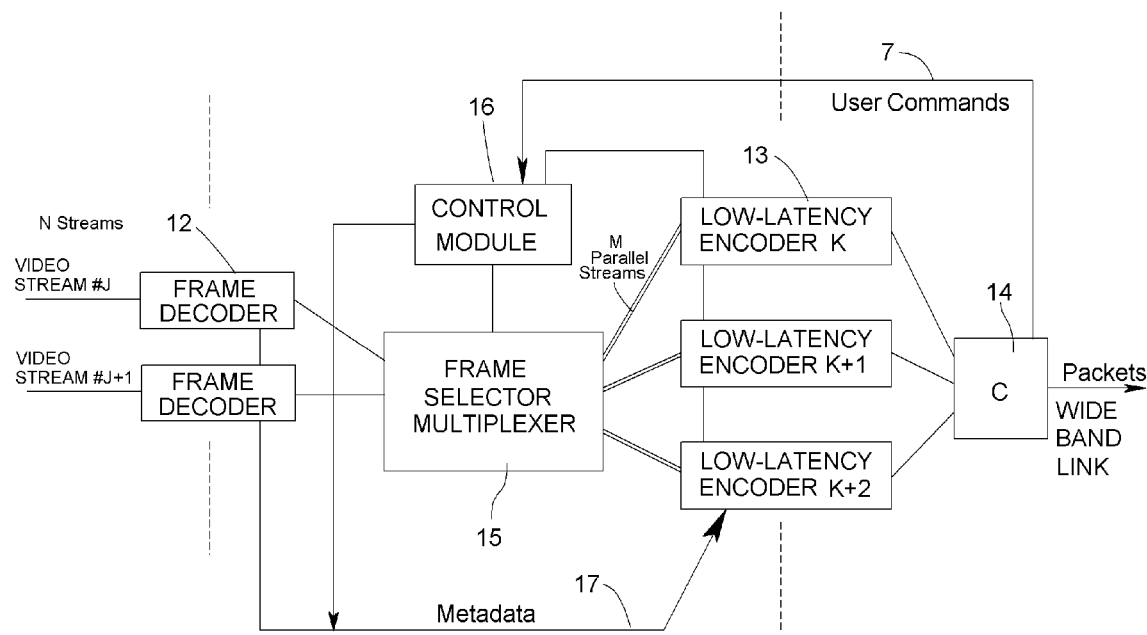
FIG. 3 shows details of a multiplexer that uses fast frame coding to implement the present invention.

FIG. 3 shows a particular embodiment of a decoder/coder that can be used according to the present invention. The blocks in FIG. 3 may be implemented entirely in software in a fast enough processor, or parts of the system may be implemented as hardware modules or plug-ins. The system shown in FIG. 3 receives N incoming video streams and decodes each of them into frames with a frame decoder 12. Each of the input streams, in addition to having different content, may have different transmission characteristics such as compression, frame rate and the like. Each decoder 12 supplies can supply an identical frame rate into the frame selector 15 regardless of its input frame rate. The frame selector (or frame grabber) picks off frames from requested video inputs and supplies them in parallel to from 1 to N low-latency frame encoders 13. Generally, one encoder 13 is dedicated to each active remote user. Each frame encoder 13 composes output frames that are formatted and have input content according to programmed instructions from that particular user (windows such as those shown in FIG. 2). A control module 16 controls both the frame selector 15 and the various frame encoders 13 according to instructions from the user as to what content they want and what format they want it in. The bank of frame encoders 13 are combined by a combiner 14 and streamed onto the network. The number of encoders 13 (and hence the number of simultaneous users) is determined by the network capacity (available bandwidth) and by the capability of the frame selector 15. User commands 7 are processed and their content is temporarily programmed into the frame selector 15 and a user's assigned encoder 13.

Each encoder 13 may also append or include metadata relating to the content and/or format of the output frames it is generating. Some of the metadata 16 can come from the input streams, while some of it can be generated by the control module 16. As previously stated, the metadata may include information about the size and location of a particular window on the screen, geographic location of the content source either as a named location or as longitude/latitude, direction of view, height of view, identification of the source, and the like.

Figure 4:
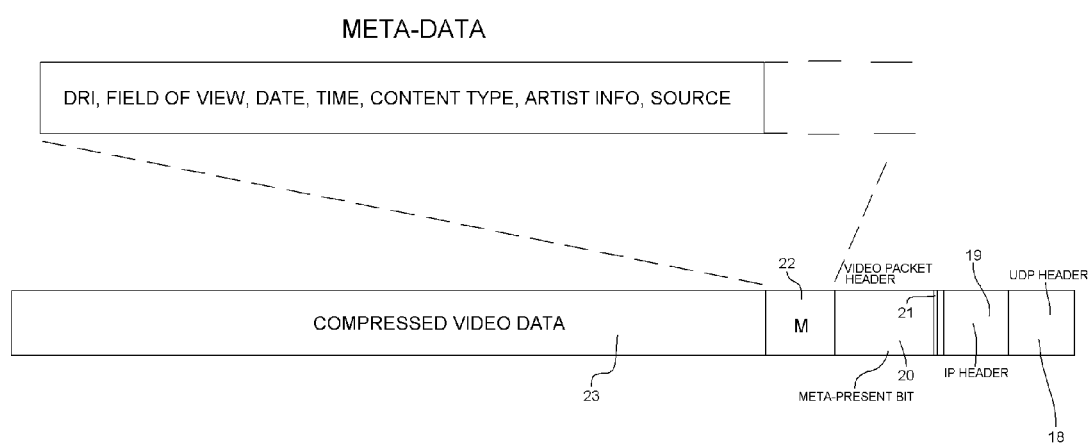
FIG. 4 shows details of coded video packets and metadata.

FIG. 4 shows an example of a packet containing both video data and metadata. This packet is given for example only of how a packet might carry the video and meta-data of the present invention. The packet of FIG. 4 is shown with both a UDT header 18 and an IP header 19. While most such packets will use IP, many other transmission techniques are available besides UDT at that level of the communications hierarchy. The example packet of FIG. 4 next contains a video packet header 20 that identifies which part of the frame (or frames) in the output stream its video represents. A particular bit 21 in the video packet header 20 can indicate whether that packet contains any metadata. Other bits in the video packet header 20 or in the payload 23 can indicate which window in the currently transmitting frame the metadata pertains to. Metadata 22 can be placed somewhere in the packet. The rest of the packet is dedicated to payload 23 which is usually compressed video data.

The example of FIG. 4 shows metadata 22 riding along with video data. An optional method it to transmit all the metadata for a particular format at once before the first frame of a new format or between frames. Metadata can also be transmitted in independent network packets to the same user destination, but in parallel with (independently from) the video packets. In general, the quantity of metadata, no matter how intense, is very much less than the quantity of video data. FIG. 4 also shows a blowup of example metadata including direction, field of view, date, time, content type, artist information and source. Metadata may contain other additional information.

In another embodiment of the present invention, the user can transmit commands back to one of the input video sources. For example, in a security situation, a guard might want to pan, tilt or zoom a camera. Typically, these commands can travel independently over the network directly from the user's computer to the video source. The user can be made aware of the network address of the particular video source by metadata from that source, and normal network packets can be sent to that destination.

In some embodiments of the present invention, it is possible for a client receiving several sub-video streams in a single stream along with metadata relating to those sub-streams to break up the video frames into frames of the sub-videos based on the metadata information. The system can then display the separate videos on a map, or whin a 3-dimensional visualization, according to the information on each of the sub-videos such as location, direction, field of view, and the like.

The present invention provides a unique system and method for dynamic encoding of multiple video image streams to a single video stream whose format and content can be totally under user control. Switching between different video content can be very fast without buffering delays.

Several descriptions and illustrations have been provided to aid in understanding the present invention. One with skill in the art will realize that numerous changes and variations can be made without departing from the spirit of the invention. Each of these changes and variations is within the scope of the present invention.

We claim:

1. A system for streaming multiple video images comprising:
    a server adapted to service one or more remote users over a network receiving a plurality of input video bit streams; said server having hardware that includes a plurality of frame decoders, a video frame selector, one or more low latency encoders each having a latency of less than 10 milliseconds, and a combiner, the server configured to present content from at least some of the input video bit streams to regions of a remote user's screen display;
    the plurality of frame decoders, one assigned to each of said input video bit streams, being adapted to produce sequential output video frames from the input video bit stream at a predetermined frame rate;
    the video frame selector, under control of the server, being configured to dynamically select some of said sequential output video frames to produce selected video output frames for combining into a single video stream containing said regions of the remote user's screen display for transmission over the network in immediate response to input received from the remote user over the network, wherein said input received from the user can dynamically modify which video input streams are combined into a single output stream for transmission to that particular user and dynamically select a display screen position, zoom level and size for each video input stream combined;
    the one or more low latency encoders, each assigned to a different remote user, configured to digitally encode the selected output video frames for that particular user along with metadata information related to chosen input video bit streams including one or more of their content, screen position, size and zoom level into a single video stream for transmission over a network; the single video stream having the content, screen position, zoom level and size dynamically selected by the particular user over the network for each of the selected video output frames;
    the combiner configured to combine outputs from different low latency encoders assigned to different remote users into output streams for streaming over the network to the different remote users;
    wherein said metadata includes at least one of location, direction of view, field of view, content type, or artist information.

2. The system of claim 1 wherein said plurality of input video streams originate from different sources.

3. The system of claim 2 wherein said different sources can include mobile devices, security cameras, aerial drones or pre-recorded video.

4. The system of claim 1 wherein said input received from a particular user is received over the network concurrently with transmission of the coded output stream to that user.

5. The system of claim 1 wherein said input received from the particular user can include a requested location, date, time, specific video streams to view, or a size for each input video stream to view.

6. The system of claim 1 wherein there is a plurality of low latency encoders servicing a plurality of remote users.

7. A method of transmitting a plurality of input video streams to a user in a single video output stream under dynamic user control comprising:
    receiving at a server a plurality of video input bit streams;
    receiving at the server dynamic input from a remote user over a network specifying instantaneous format and content of a desired output video stream, including one or more chosen video streams and a zoom level and size for each chosen video stream;

encoding the output frames into coded output frames for digital streaming along with metadata information related to each of the input frames including their position and resolution into a single video stream for transmission over a network, combining at the server the coded output frames from each of the selected input video streams at the dynamically selected display zoom level, screen position and size into single output frames and streaming the single output frames to the remote user over the network;

wherein said metadata includes at least one of location, direction of view, field of view, content type, or artist information.

8. The method of claim 7 wherein said plurality of video input streams can include video streams from mobile devices, security cameras, aerial drones or pre-recorded video.

9. The method of claim 7 decoding each of said video input streams into incoming image frames and then combining some of said incoming image frames into outgoing image frames for transmission over the network.

10. The method of claim 7 wherein each output frame of said desired output video stream contains input frames from one or more of said video input streams, each of said input frames in a particular output frame having a content, size, zoom level and screen position in said desired output frame dynamically determined by the input from the remote user.

11. The method of claim 7 wherein said input from the remote user can include a requested location, date, time, specific video streams to view, or a size for each video input stream to view.

12. A method of transmitting a plurality of input video streams to a user in a single video output stream under dynamic user control comprising:

receiving at a server a plurality of video input streams;

receiving at the server dynamic commands from a remote user over a network containing instructions that dynamically specify format and content of a desired output video stream including a choice of video input streams and a zoom level and size for each chosen video input stream;

combining at the server from each of the selected input video streams at the dynamically selected zoom level and size into one single output stream;

encoding output frames along with metadata information related to each of the input frames combined within them including their position, size and zoom level, into a single video stream for transmission over a network;

transmitting said desired output video stream over the network to the user;

wherein said metadata includes at least one of location, direction of view, field of view, content type, or artist information.

13. The method of claim 12 wherein each output frame of said output video stream contains input frames from one or more of said video input streams, each of said input frames in a particular output frame having a size and position in said output frame dynamically determined by the input from the remote user.

* * * * *